April 14, 1931.  H. E. WOERNLE  1,800,238
HINGE
Filed Feb. 14, 1928
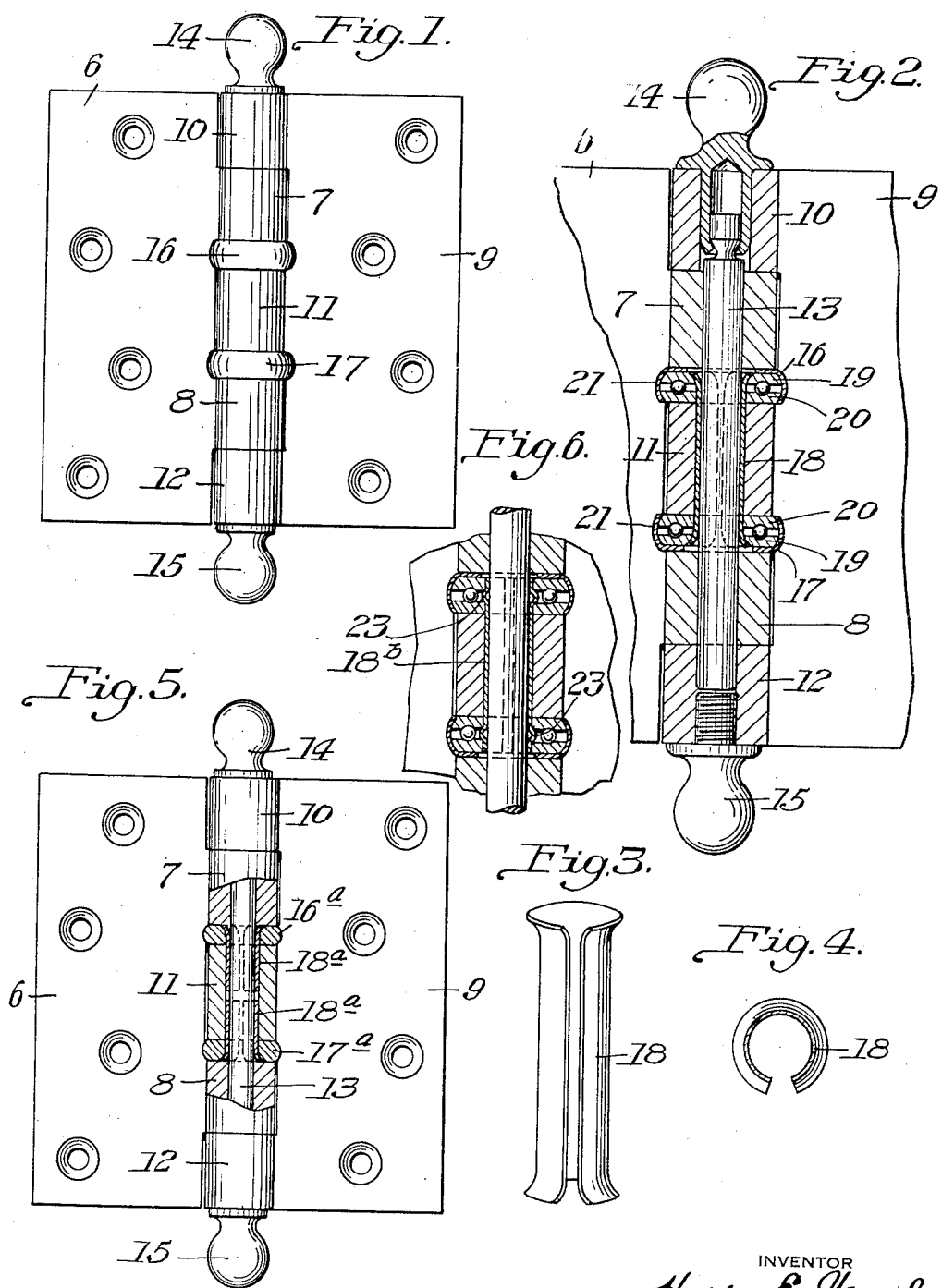
INVENTOR
Harry E. Woernle
By Archworth Martin
Attorney Patented Apr. 14, 1931

1,800,238

UNITED STATES PATENT OFFICE

HARRY E. WOERNLE, OF PITTSBURGH, PENNSYLVANIA, ASSIGNOR TO McKINNEY MANUFACTURING COMPANY, OF PITTSBURGH, PENNSYLVANIA, A CORPORATION OF PENNSYLVANIA

HINGE

Application filed February 14, 1928. Serial No. 254,224.

My invention relates to hinges, and more particularly to those devices known as butt hinges, composed of hinge leaves that are provided with knuckles, the knuckles of one leaf being held in assembled relation with the knuckles of the other leaf, by a pintle or hinge pin. The invention however is susceptible of employment in various other relations.

In some types of hinges, bearing units of various types are provided between adjacent ends of co-operating knuckles, for the purpose of reducing frictional resistance to turning movement, reducing wear on those ends of the knuckles which support the weight of a door, etc.

Various means have heretofore been employed for holding bearing units in place upon the ends of hinge knuckles, so that such units will not become lost and misplaced during handling of a hinge with its leaves in disassembled relation. These means have been unsatisfactory for various reasons as being difficult and tedious of installation, difficulty of removal, etc., it being necessary in most instances to destroy the holding means when it is desired to remove a bearing unit from a knuckle for the purpose of replacement or repair.

One object of my invention is to provide a hinge structure wherein bearing units can be more quickly applied and removed than by the methods heretofore employed, and wherein the units will nevertheless be adequately supported against displacement.

Another object of my invention is to simplify and improve generally the structure and operation of hinge devices of the character referred to.

Some of the forms which my invention may take are shown in the accompanying drawing, wherein Figure 1 is an elevational view of a hinge embodying my invention; Fig. 2 is a vertical sectional view of the structure of Fig. 1, on an enlarged scale; Fig. 3 is a view, on a still further enlarged scale, of the sleeve of Fig. 2 for holding the bearing units in place; Fig. 4 is a cross sectional view of the device of Fig. 3; Fig. 5 is a view showing a modification of the structure of Fig. 2, and Fig. 6 shows still another modification.

Referring to Fig. 1, I show a hinge leaf 6 that is provided with knuckles 7 and 8 and a hinge leaf 9 that carries knuckles 10, 11 and 12. The leaves are held in assembled relation by a pintle 13 that extends into the knuckles and whose upper end is of reduced diameter and is rotatably supported in a recess of a ball tip 14, so that the pintle will tend to rotate with the leaf 6 by reason of its greater frictional contact with the knuckles 7 and 8, thus avoiding wearing away of the pintle at the points where greatest strains are imposed thereon, namely at the knuckles 7 and 8. This feature however does not constitute a part of the present invention. The lower end of the knuckle 12 is closed by a ball tip 15 that is driven or screw-threaded into said knuckle.

In the device of Fig. 2, I show bearing units 16 and 17 that are held in place upon the ends of the knuckle 11 by a split sleeve 18 of resilient material such as steel, brass, bronze, etc.

Each of the units 16—17 is composed of a pair of ball races 19 and 20 between which hardened steel balls are interposed, and a housing 21 extending over the ball race 19 and having one edge loosely bent around the inclined edge of the ball race 20, so that while the ball race 20 may rotate freely with respect to the housing 21 and the race 19, it will, nevertheless be held against falling out when the unit is not in place in the hinge.

The sleeve 18 is of only partially cylindrical form in that its longitudinal edges are spaced apart as shown more clearly in Figs. 3 and 4. The ends of the sleeve 18 are flared so as to extend over the inner bevelled edges of the races 19 and thereby hold the units in place upon the knuckle 11. The inner diameter of the knuckle 11 is preferably somewhat larger than the internal diameter of the knuckles 7, 8 and 12, for instance, so that when the sleeve is inserted, the pintle 13 will have adequate bearing support throughout its length.

In assembling the device, the leaves 6 and 9 are separated. The sleeve 18 is then compressed to bring its longitudinal edges together so that the flared ends thereof will be drawn radially inward a sufficient distance to permit insertion of the sleeve through the knuckle 10 and into the knuckle 11. The internal diameter of the knuckle 10 is approximately the same as the internal diameter of the knuckle 11, so that the sleeve 18 can be more readily inserted. The larger diameter of the knuckle 10 with respect to the internal diameter of the knuckle 7, for instance, is compensated for by the fact that the shank of the ball tip 14 is of somewhat greater diameter than the body portion of the pintle 13, so that the space within the knuckle 10 is snugly filled.

However, the sleeve 18 may have its longitudinal slot of such width that the sleeve could be inserted through a smaller knuckle such as a knuckle 12 into the knuckle 11, if desired. Likewise, it would be unnecessary to have the knuckle 10 of enlarged diameter if the space between the knuckles 10 and 11 were sufficient to permit the sleeve 18 being inserted therebetween in a lateral direction and then shifted axially to bring it into place within the knuckle 11. The bearing units can be placed upon the knuckle 11 either before or after the insertion of the sleeve 18 therein. In order to remove the bearing units it is necessary only to collapse the sleeve 18 slightly and withdraw it from the knuckle, or a bearing unit can be removed simply by collapsing the sleeve somewhat and withdrawing such unit, it being understood that when such removal is to be effected, the pintle is first removed and the leaves 6 and 9 taken apart.

It will be seen that since the sleeve 18 is of resilient material, it can be applied and removed at will, without the use of tools and without deforming or injuring the sleeve.

In Fig. 5, I show bearing units 16a and 17a which may be in the form of washers, such as steel, phosphor bronze, fiber, etc. In this case, I show sleeve sections 18a that are separately formed and whose outer ends are flared to hold the units in place upon the knuckle. In this case, as in the structure of the other figures, the sleeves 18a are of resilient material and have longitudinal slots so that they may be compressed to permit ready insertion thereof into place, the resiliency of the metal being such that the frictional force exerted as a result of their expansive action upon the wall of the knuckle will be sufficient to support the bearing units against accidental displacement in handling. By this arrangement, the sleeves can ordinarily be inserted by moving them laterally between the knuckle 11 and the knuckles 10 or 12, as the case may be, and then shifting them axially into position in the knuckle 11.

Figure 6 shows a structure wherein it is not necessary to flare the ends of the tube and to bevel the edges of the outer ball races to receive the flared ends. In this form of device, the tube 18b is of substantially uniform diameter throughout its length, but has beads 23 struck out therefrom near its ends, which beads lie in the spaces between adjacent ball races, to retain the bearing units in position.

The various changes in detail and general arrangement could obviously be made without departing from the spirit and scope of the invention. For instance, in case of Fig. 2, one of the units 16—17 may be omitted and the adjacent flared end of the sleeve engage directly with the knuckle 11 to hold the sleeve and the other unit in place. Also, particularly in the case of the sleeves of Fig. 5, the units could be placed on any of the knuckles desired, instead of on the middle knuckle 11, to suit conditions, as for instance where a greater or smaller number of knuckles are employed than in the structures shown in the drawing.

I claim as my invention:—

1. The combination with a hinge leaf having a knuckle, of a bearing and means for detachably supporting the bearing on one end of the knuckle, comprising a radially resilient split sleeve having interlocking relation with said bearing and its body portion expanded in the knuckle by reason of its inherent resiliency, the sleeve being split throughout its length.

2. In combination, a hinge leaf having a knuckle, a bearing adapted to cooperate with an end surface of the knuckle, and a retaining member for holding the knuckle and bearing in assembled relationship, such retaining member being adapted for connection with the knuckle and having a sleeve portion adapted to extend through the bearing, split longitudinally at its outer extremity, shaped to conform with the engaging portion of the bearing, and inherently resilient so as to naturally assume proper cooperative relationship with the bearing to hold the same in assembled relationship with the knuckle.

3. Means for maintaining a bearing in place on a hinge knuckle or like member, comprising a retaining device having a portion adapted to enter such member and having a sleeve portion adapted to extend through the bearing, split longitudinally at its outer extremity and shaped to conform with the engaging portion of the bearing, such retaining device being adapted for insertion and removal at will into and out of said member and bearing without permanent deformation or damage to the device thereby.

In testimony whereof I, the said HARRY E. WOERNLE, have hereunto set my hand.

HARRY E. WOERNLE.